(12) United States Patent
Bulakci et al.

(10) Patent No.: US 12,425,480 B2
(45) Date of Patent: Sep. 23, 2025

(54) ACCESS NETWORK WITH SERVICE-BASED INTERFACES

(71) Applicant: Nokia Technologies Oy, Espoo (FI)

(72) Inventors: Ömer Bulakci, Munich (DE); Bruno Landais, Pleumeur-Bodou (FR); Laurent Thiebaut, Antony (FR); Thomas Belling, Erding (DE); Anja Jerichow, Grafing bei München (DE); Hannu Flinck, Helsinki (FI); Jens Gebert, Oberstenfeld (DE); Christian Mannweiler, Munich (DE); Subramanya Chandrashekar, Bangalore (IN); Philippe Godin, Versailles (FR)

(73) Assignee: Nokia Technologies Oy, Espoo (FI)

( * ) Notice: Subject to any disclaimer, the term of this patent is extended or adjusted under 35 U.S.C. 154(b) by 176 days.

(21) Appl. No.: 18/258,074

(22) PCT Filed: Dec. 18, 2020

(86) PCT No.: PCT/EP2020/087184
§ 371 (c)(1),
(2) Date: Jun. 16, 2023

(87) PCT Pub. No.: WO2022/128125
PCT Pub. Date: Jun. 23, 2022

(65) Prior Publication Data
US 2024/0056509 A1    Feb. 15, 2024

(51) Int. Cl.
*H04L 67/51* (2022.01)
*H04L 41/50* (2022.01)

(52) U.S. Cl.
CPC .......... *H04L 67/51* (2022.05); *H04L 41/5058* (2013.01)

(58) Field of Classification Search
CPC .......................... H04L 67/51; H04L 41/5058
USPC ......................................................... 709/203
See application file for complete search history.

(56) References Cited

U.S. PATENT DOCUMENTS

| | | | |
|---|---|---|---|
| 2014/0162635 A1* | 6/2014 | Cui | H04W 48/18 455/434 |
| 2021/0204199 A1* | 7/2021 | Yu | H04W 36/0011 |
| 2021/0235244 A1* | 7/2021 | Bartolomé Rodrigo | H04L 67/52 |

* cited by examiner

*Primary Examiner* — Wing F Chan
*Assistant Examiner* — Leon Y Tseng
(74) *Attorney, Agent, or Firm* — Barta Jones, PLLC (57) ABSTRACT

It is provided a method comprising at least one of a) and b): a) monitoring whether a service request to produce a producer service is received and producing the producer service if the service request is received, wherein the producer service is a service produced by the access network; and b) consuming a producer service from a core network or an access network, wherein the producer service is consumed by an access network.

3 Claims, 6 Drawing Sheets

ACCESS NETWORK WITH SERVICE-BASED INTERFACES

RELATED APPLICATION

This application is a national stage application of PCT Application No. PCT/EP2020/087184, filed on Dec. 18, 2020, which is incorporated herein by reference.

FIELD OF THE INVENTION

The present disclosure relates to an access network with service-based interfaces.

Abbreviations

3GPP 3$^{rd}$ Generation Partnership Project
4G/5G/6G 4$^{th}$/5$^{th}$/6$^{th}$ Generation
5GC 5GCN
5GS 5G system
5MBS 5G Multicast Broadcast Service
AF Application Function
AMF Access and Mobility Function
AN Access Network
ANR Automatic Neighbour Relation
AP Application Protocol
API Application Programming Interface
AUSF Authentication Server Function
CD/CI Continuous Delivery/Continuous Integration
CMF Cell Management Function
CN Core Network
CP Control Plane
CU CP Central Unit CP (see 3GPP TS 38.300)
CU UP Central Unit User Plane (see 3GPP TS 38.300)
DAF Data Analytics Function
DL Downlink
DN Data Network
DRB Data Radio Bearer
DSF Data Storage Function
DU Distributed Unit (see 3GPP TS 38.300)
eNB evolved NodeB
FQDN Fully Qualified Domain Name
gNB next generation NodeB
HTTP Hypertext Transfer Protocol
HTTPS Hypertext Transfer Protocol—Secure
LCS Location Services
LMF Location Management Function
MDAF Management Data Analytics Function
MDT Minimization of Drive-tests
NAS Non-Access Stratum
NCGI New Radio Cell Global Identifier
NCRT Neighbour Cell Relation Table
NEF Network Exposure Function
NF Network Function
NG Next Generation
NG-C NG Control
NPN Non-public Network
NRF Network Repository Function
NSSF Network Slice Selection Function
NWDAF Network Data Analytics Function
ORAN Open RAN
P2P Peer to peer (point-to-point)
PCF Policy Control Function
PDU Protocol Data Unit
PLMN Public Land Mobile Network
PNF Physical Network Function
QoS Quality of Service
RAN Radio Access Network
RRC Radio Resource Control
RU Remote Unit
SB Service-based
SBA Service-based Architecture
SBI Service-based Interface
SBMA Service-based Management Architecture
SCP Service Communication Proxy
SCTP Stream Control Transmission Protocol
SeGW Security Gateway
SMF Session Management Function
SNPN Stand-alone NPN
SON Self-Optimizing Network
TAI Tracking Area Identifier
TEID Tunnel Endpoint Identifier
TLS Transport Layer Security
UDM User Data Management
UE User Equipment
UL Uplink
UMF User Management Function
UP User Plane
UPF User Plane Function
VNF Virtualized Network Function

BACKGROUND

Figure 1A:
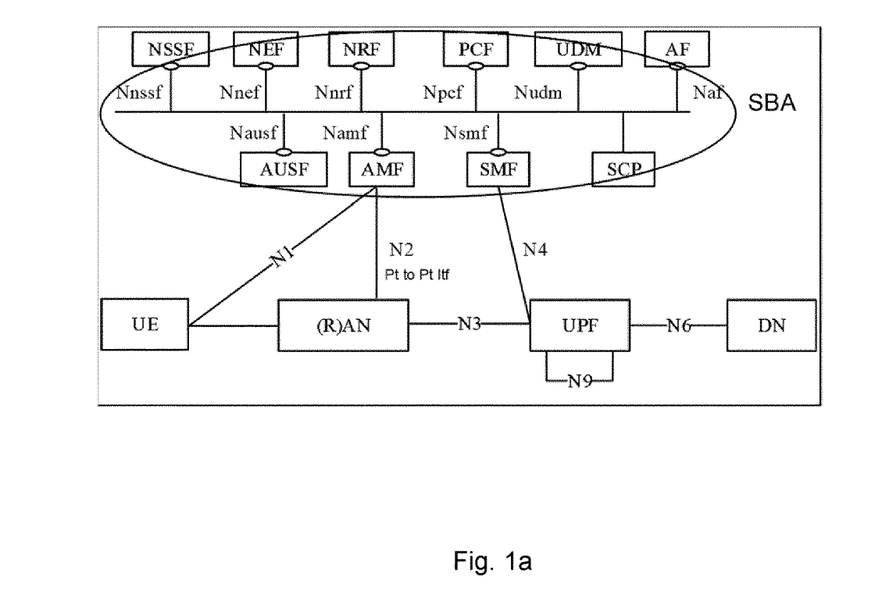
FIG. 1 shows SBA in 5GC (FIG. 1a) and SBMA (FIG. 1b) in 5G Network management.
Figure 1B:
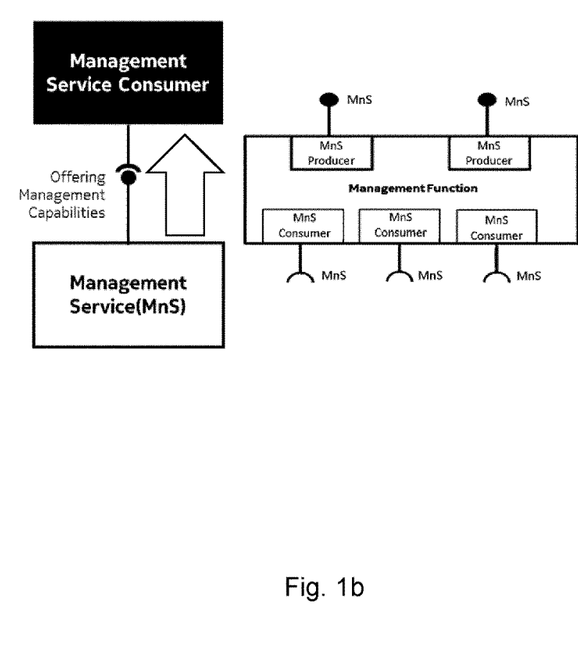

The mobile and wireless communications networks are increasingly deployed in cloud environments. Furthermore, the 5G and the new generations beyond are aimed to be flexible by adding new functionalities into the system capitalizing on the cloud implementations. To this end, as shown in FIG. 1, the 5G core network (5GC) is defined as service-based (SB) architecture (SBA) (FIG. 1a) [1], and the network management is also employing SBA principles (FIG. 1b), referred to as service-based management architecture (SBMA) [2].

In the 5GC service-based architecture, a consumer inquires NRF in order to discover an appropriate service producer instance. That is, in 5GC, as described in [4], in order to discover and select the appropriate service instances, multiple filtering criteria may be applied by NRF.

5GC Service Based architecture APIs are based on the HTTP protocol. According to [1], an NF service is one type of capability exposed by an NF (NF Service Producer) to other authorized NF (NF Service Consumer) through a service-based interface. A Network Function (NF) may expose one or more NF services. NF services may communicate directly between NF Service Consumers and NF Service Producers, or indirectly via an SCP.

An access network is a network that offers access (such as radio access) that enables to connect subscribers to one or more core networks. The access network may provide 3GPP access such as GSM/EDGE, UTRA, E-UTRA, or NR radio access or non-3GPP access such as WLAN). The access network is contrasted with the core network, which is an architectural term relating to the part of the network (e.g. 3GPP network) which is independent of the connection technology of the terminal (e.g. radio, wired) and which provides core network services such as subscriber authentication, user registration, connectivity to Packet Data Networks, subscription management, etc. An access network and a core network may correspond respectively e.g. to a 3GPP access network and 3GPP core network as defined in 3GPP TS 23.501 and TS 38.401.

REFERENCES

[1] 3GPP TS 23.501, "System architecture for the 5G System (5GS)"
[2] 3GPP TS 28.533, "Management and orchestration; Architecture framework"
[3] 3GPP TS 38.401, "NG-RAN; Architecture description"
[4] 3GPP TS 29.510

SUMMARY

It is an object of the present invention to improve the prior art.

According to a first aspect of the invention, there is provided an apparatus comprising: one or more processors, and memory storing instructions that, when executed by the one or more processors, cause the apparatus to perform at least one of a) and b): a) monitor whether a service request to produce a producer service is received and produce the producer service if the service request is received, wherein the producer service is a service produced by the access network; and b) consume a producer service from a core network or an access network, wherein the producer service is consumed by an access network.

According to a second aspect of the invention, there is provided an apparatus comprising: one or more processors, and memory storing instructions that, when executed by the one or more processors, cause the apparatus to perform: monitor whether an inquiry for an address of a network function producing a service of an access network or for an address of an access network's producer service is received; provide the address of the access network function or service in response to the inquiry; wherein the service comprises at least one of a service registration and discovery service of the access network; a protocol data unit session resource service of the access network; a context service of a terminal served by the access network; a mobility service of a terminal served by the access network; a tracing service of a terminal served by the access network; a downlink and/or uplink non-access stratum message transfer service of the access network; an event exposure service of the access network; a positioning service of a terminal served by the access network;

a paging service of a terminal served by the access network; a warning message delivery service of the access network; a broadcast and/or multicast service of the access network; a data analytics service of the access network; a data storage service of the access network; a data radio bearer service of the access network; and a self-optimizing network service of the access network.

According to a third aspect of the invention, there is provided an apparatus comprising: one or more processors, and memory storing instructions that, when executed by the one or more processors, cause the apparatus to perform: inquire a repository function of an access network for an address of a service producer of a producer service of the access network; receive the address of the service producer or an address of the access network's producer service in response to the inquiring; request the producer service from the service producer using the received address.

According to a fourth aspect of the invention, there is provided a method comprising at least one of a) and b): a) monitoring whether a service request to produce a producer service is received and producing the producer service if the service request is received, wherein the producer service is a service produced by the access network; and b) consuming a producer service from a core network or an access network, wherein the producer service is consumed by an access network.

According to a fifth aspect of the invention, there is provided a method comprising: monitoring whether an inquiry for an address of a network function producing a service of an access network or for an address of an access network's producer service is received; providing the address of the access network function or service in response to the inquiry; wherein the service comprises at least one of a service registration and discovery service of the access network; a protocol data unit session resource service of the access network; a context service of a terminal served by the access network; a mobility service of a terminal served by the access network; a tracing service of a terminal served by the access network; a downlink and/or uplink non-access stratum message transfer service of the access network; an event exposure service of the access network; a positioning service of a terminal served by the access network;

a paging service of a terminal served by the access network; a warning message delivery service of the access network; a broadcast and/or multicast service of the access network; a data analytics service of the access network; a data storage service of the access network; a data radio bearer service of the access network; and a self-optimizing network service of the access network.

According to a sixth aspect of the invention, there is provided a method comprising: inquiring a repository function of an access network for an address of a service producer of a producer service of the access network; receiving the address of the service producer or an address of the access network's producer service in response to the inquiring; requesting the producer service from the service producer using the received address.

Each of the methods of the fourth to sixth aspects may be a method of a service-based access network.

According to a seventh aspect of the invention, there is provided a computer program product comprising a set of instructions which, when executed on an apparatus, is configured to cause the apparatus to carry out the method according to any of the fourth to sixth aspects. The computer program product may be embodied as a computer-readable medium or directly loadable into a computer.

According to some embodiments of the invention, at least one of the following advantages may be achieved:
higher flexibility;
better scalability;
embedded security;
easy deployment of services;
placement of functions according to latency requirements;
easier system maintenance.

It is to be understood that any of the above modifications can be applied singly or in combination to the respective aspects to which they refer, unless they are explicitly stated as excluding alternatives.

BRIEF DESCRIPTION OF THE DRAWINGS

Further details, features, objects, and advantages are apparent from the following detailed description of the preferred embodiments of the present invention which is to be taken in conjunction with the appended drawings, wherein.

DETAILED DESCRIPTION OF CERTAIN EMBODIMENTS

Herein below, certain embodiments of the present invention are described in detail with reference to the accompanying drawings, wherein the features of the embodiments can be freely combined with each other unless otherwise described. However, it is to be expressly understood that the description of certain embodiments is given by way of example only, and that it is by no way intended to be understood as limiting the invention to the disclosed details.

Moreover, it is to be understood that the apparatus is configured to perform the corresponding method, although in some cases only the apparatus or only the method are described.

Access Network (AN), e.g., Radio AN (RAN), and the associated interfaces, e.g., within AN and between AN and Core Network (CN) are defined as legacy point-to-point (P2P) interfaces since the very early generations of PLMN. For example, in the 5G System (5GS), N2 is designed as a 3GPP NG-C Application Protocol over SCTP, between the gNB (or ng-eNB) and the AMF (Access and Mobility management Function). Further P2P interface examples within AN are the Xn interface between two gNBs, the F1 interface between a central unit (CU) and a distributed unit (DU) in case of a disaggregated gNB and the E1 interface between the CU-CP and the CU-UP in case of a disaggregated CU [3].

Various aspects and embodiments of the present invention may be applicable to not only 5G mobile and wireless communication networks but also to, e.g., the next generations beyond 5G (i.e., 6G, 7G, . . . ).

There are at least the following problems with the legacy AN design and the associated P2P interfaces:
- The P2P AN-CN, i.e., NG-AP protocol between AN and CN, and AN-AN interfaces assume fixed roles of the communicating peers as well as a fixed set of services exhibited across this interface.
- The used protocols (e.g., NG-AP, Xn-AP, F1AP, E1AP, etc.) do not support basic cloud functionality to discover services and to scale services up and down.
- Services cannot be deployed independently, which limits the scalability.
- Functions, particularly the control plane (CP) functions, cannot be placed flexibly to, e.g., take into account the different latency requirements of different services.
- New feature introduction (CD/CI style) is not possible without substantially impacting the protocols and reference point peers.
- Furthermore, feature/service scaling in/scaling out is not made possible unless there is a Load Balancer that hides feature/service scaling in/scaling out from the peers of node. This Load Balancer would add signaling load.
- Maintaining a system consisting of cloud native and non-cloud native protocols in predominantly cloud based environment requires special expertise which makes the maintenance of the system expensive.
- UE-associated functions (i.e. functions requiring an identifier of the UE such as those related to the subscription of the UE or the data flow of the UE; they typically require involvement of CN) have a strict delay-tolerance limit and hence the current principle of handling all RAN C-plane functions uniformly in a gNB-CU-CP is sub-optimal.

Some example embodiments of the invention provide an SB-(R)AN architecture to enable an SB overall system architecture and framework with service-based interfaces (SBI) between (R)AN and CN, and within (R)AN. (In the following, (R)AN and AN are used synonymously, unless otherwise stated or made clear from the context.) The services in AN and CN that can be provided and consumed across and within those domains are detailed.

That is, the application of an SB architecture to an Access Network according to some example embodiments of the invention may take into account at least one of the following requirements:
1. RAN architecture is distributed where an access network element controls a geographical region;
2. The distributed access network elements may coordinate among each other to enable efficient radio operation, e.g., interference coordination, UE mobility, and load balancing;
3. The services may be discovered, provided, and consumed both inside the distributed AN architecture and across other service-based domains The application of an SB architecture to an Access Network according to some example embodiments of the invention may take into account at least one of the following additional optional requirements:
1. Some of the functionalities of the access network elements may be centralized, e.g., in a central unit
2. The RAN architecture may comprise both aggregated access nodes acting as a single NF and decomposed access nodes with defined services and/or multiple NFs
3. Each access network element may include specific functionalities not present in another access network element, such as frequency bands, capabilities, and antenna configurations
4. The RAN architecture may be implemented in part in a virtualized way, i.e., RAN architecture may comprise both physical network functions (PNFs) and virtualized network functions (VNFs)
5. Access network elements may handle realtime UE traffic The SB-RAN architecture according to some example embodiments of the invention is configured to implement SB communication intra-(R)AN, inter-(R)AN and crossdomains (e.g. between AN and CN, between AN and 3rd party, or between AN and management plane), wherein the SB-RAN architecture according to some example embodiments of the invention may comprise A. new services (APIs) produced by the AN that can be consumed by CN, wherein the new services include one or more of the services listed in Table 1

B. new services (APIs) produced by the CN that can be consumed by AN, wherein the new services include one or more of the services listed in Table 2

C. new services (APIs) produced by the AN that can be consumed by AN, wherein the new services include one or more of the services listed in Table 3

The SB-RAN architecture according to some example embodiments of the invention may comprise at least one of the network functions listed in Table 4.

The SB-RAN architecture according to some example embodiments of the invention may comprise an inter-AN SBI Management a cross-domain (also named inter-domain) NRF Centralized or distributed AN NRFs Optionally, UE-associated and non-UE associated functions may be separated allowing to have a different granularity for these functions. This permits the design and behavior of the corresponding SBIs to be different.

Some SB communication interfaces may correspond to RAN internal interfaces, e.g., F1 and E1. Some SB communication interfaces may correspond to ORAN interfaces, e.g., E2 and O1. An SB communication interface may correspond to an interface between AN and SBMA. SBMA may be cross-domain (i.e. for CN and AN).

Some example embodiments of the invention provide an SB overall architecture, comprising SB-(R)AN and SB-CN, and the interactions between the NFs in the same domain and across domains through SBI. A new service and/or a new NF can be flexibly introduced to the SB overall architecture.

Figure 2:
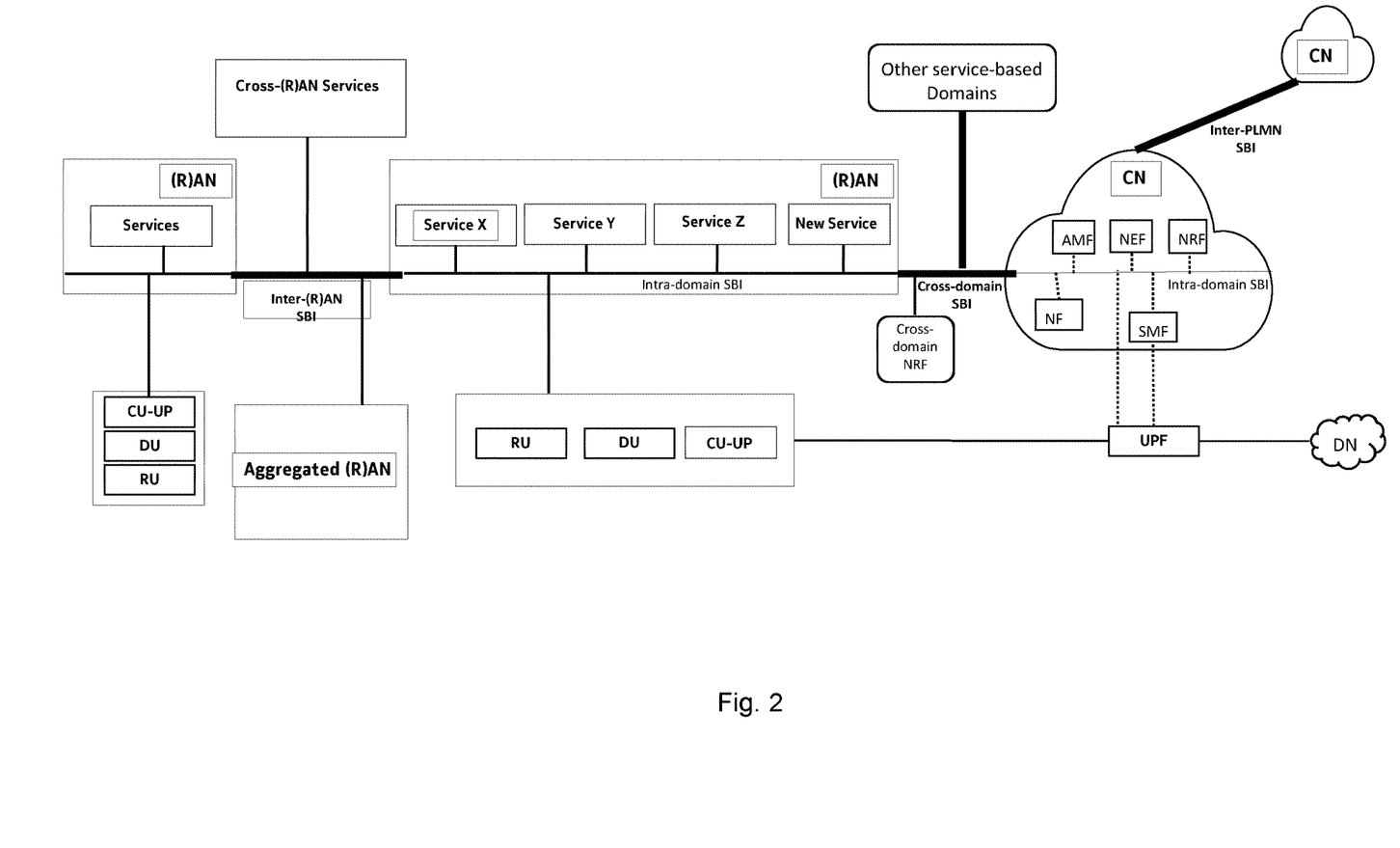
FIG. 2 shows an SB overall system architecture based on services according to some example embodiments of the invention.

Some aspects of some example embodiments of the invention are described at greater detail:

SB Overall System Architecture Framework with Service-Based Interfaces:

FIG. 2 illustrates a SB overall system architecture framework according to some example embodiments of the invention including the different domains. For the sake of simplicity, the interrelation of one (R)AN node with the CN is shown; however, any (R)AN node may communicate with other SB domains, e.g., CN.

Inside a domain, the communication between the offered services can be performed via the intra-domain SBI. The interface between any AN node and/or between any AN service can be via an inter-AN SBI and the interface between an AN node and/or AN service and the CN and/or CN service can be via a cross-domain (also named inter-domain) SBI (as shown in FIG. 2), or (e.g. for smaller scale deployments) there may be a single SBI domain that encompasses the AN and the Core. The cross-domain SBI may connect any SB-domain in a wireless and mobile communications system. The interface between the CNs of two PLMNs may also be realized via SBI, e.g., inter-PLMN SBI, as shown in FIG. 2. In case of unified SBA across all domains according to some example embodiments of the present invention, different domains may be connected via a single SBI.

The services may map to aggregated or disaggregated base stations, also referred to as AN nodes herein. Depending on the extent of virtualization, the offered services may be offered by, e.g., only a CU keeping other internal RAN interfaces (with DU, with CU UP and with RU) and the user plane interface towards the CN UPF as legacy. Nevertheless, the DUs and CU UP can also offer services. Different functional splits in AN are also possible, e.g., lower-level functional split between a DU and a radio unit/remote unit (RU).

The AN services can be in the form of intra-AN services, e.g., the services offered by an AN node, and/or in the form of inter-/cross-AN services, e.g., the AN services that may be consumed by more than one AN node. The actual implementation of the AN services can be different factoring in the deployment architecture of a network operator, e.g., whether a functional split is applied or not.

The information on the offered services can be registered in a repository as part of cross-RAN services, e.g. an Network repository Function (NRF), which can be domain-specific or cross-domain (as shown in FIG. 2). Any new service can be exposed as a new SBI and can be registered in the aforementioned repository/repositories.

One or more proxies may be used to route requests towards a service produced, and/or to select or reselect the producer of a service, for instance Service communication Proxies (SCPs).

Services of the SB Overall System Architecture

With the SB overall system architecture according to some example embodiments of the invention, the AN may support new services (i.e., new APIs) that it can expose to service consumers, e.g., CN. In Tables 1 to 3, a non-exhaustive list of such services is provided. In some example embodiments, some of these services may be merged into a single service, or some of these services may be split into plural services. Some example embodiments of the invention may provide a subset of the services shown in Tables 1 to 3.

1) New AN Services Exposed to CN

In Table 1, some AN services are listed, which may be exposed to the CN. The list is not necessarily exhaustive and not all of the listed services are exposed in all example embodiments of the invention. In further variants, some of the listed services may be combined or further split.

TABLE 1

AN services exposed to CN

| Services | Description: |
|---|---|
| AN Service registration & discovery | AN service used by core NRF and other AN and possibly CN NFs (inter-gNB or intra-gNB) to discover services and/or NFs in AN and AN capabilities. |
| PDU Session Resource | AN service used by CN to establish, modify or release PDU session resources. It may also be used by AN to notify information (e.g. requested or provided QoS, Data Usage reporting) related to the PDU session to the CN. |

TABLE 1-continued

AN services exposed to CN

| Services | Description: |
|---|---|
| UE Context | AN service used by CN to establish, modify or release a UE context within the AN. It may also be used by AN to initiate notifications towards the CN, e.g. to request the release of a UE context. |
| UE Mobility | AN service used by CN to prepare and execute an inter-AN node handover |
| UE Trace | AN service used by the CN to activate or stop traces or MDT |
| DL NAS Message Transfer | AN service used by the CN to deliver DL NAS PDUs to UEs |
| AN Event Exposure | AN service used by CN or other AN NFs to subscribe to AN events and to notify events (e.g. change of RRC state, UE Location reporting) |
| UE Positioning | AN service used by the CN to obtain UE position or measurement to enable CN to calculate the position (LCS). |
| UE Paging | AN service used by the CN to page UEs |
| Warning Message Delivery | AN service used by the CN to request the broadcast of a warning message or to cancel an on-going warning message broadcast. |
| Broadcast/Multicast | AN service used by the CN to request the broadcast or multicast of user plane packets |
| AN Data Analytics | AN service used to get statistics from the AN. Used by core NEF, NWDAF, RAN-NEF, other RAN Nodes, other service-based domains |
| Data Storage | AN service used by AN NFs to store structured (i.e. 3GPP defined) data that may be accessible to CN (e.g. UE context data). |

The AN service registration and discovery service may be mapped to a repository functionality, e.g., an NRF. Furthermore, the UE mobility service and the UE trace service may be merged into the UE context service.

2) New CN Services Exposed to AN

In Table 2, some CN services are listed, which are exposed to the AN. The list is not necessarily exhaustive and not all of the listed services are exposed in all example embodiments of the invention. In further variants, some of the listed services may be further combined or further split.

TABLE 2

CN services exposed to AN

| Services | Description: |
|---|---|
| UL NAS Message | CN service used by AN to send UL NAS PDUs to the CN (e.g. Initial UE message, UL NAS Transport) and request that they are handles by the CN. |
| UE Mobility | CN service used by AN to initiate handover related requests towards the CN (e.g. Handover Required, Path Switch Request, Handover Cancellation Request) |
| CN Service discovery. | CN service used by AN NFs to discover services and/or NFs in CN. |

The UL NAS Message and UE Mobility services may for instance be provisioned by an AMF. The CN Service discovery service may for instance by provisioned by an NRF.

3) New AN Services Exposed to AN

In Table 3, some AN services are listed, which are exposed to the AN, e.g., within an AN node or across AN nodes. The description of these services is provided from an AN perspective, as these services are used by other AN NFs. The list is not necessarily exhaustive and not all of the listed services are exposed in all example embodiments of the invention. Some of the listed services may be combined or further split. Some services may be consumed both by CN and AN; such services are listed in both Tables 1 and 3.

TABLE 3

| AN services exposed to AN | |
|---|---|
| Services | Description: |
| AN Service registration & discovery | AN service used by other AN NFs (inter-gNB or intra-gNB) to discover services in AN and AN capabilities. AN services used by AN NFs and/or services to register themselves and/or their services. |
| AN Event Exposure | AN service used by other AN NFs (inter-gNB or intra-gNB) to subscribe to AN events and to notify events (e.g., change of DU/cell) |
| UE Context | AN service used by other AN NFs (inter-gNB or intra-gNB) to establish, modify or release a UE context within the AN. It may also be used by AN to initiate notifications towards the other AN NFs (inter-gNB or intra-gNB), e.g. to request the release of a UE context. |
| DRB Resource | AN service used by AN NFs (inter-gNB or intra-gNB) to establish, modify, or release DRB resources. Inter-gNB service can be for dual connectivity. |
| UE Mobility | AN service used by AN NFs (inter-gNB or intra-gNB) to prepare and execute an inter-AN node or intra-AN node handover |
| UE Trace | AN service used by AN NFs (inter-gNB or intra-gNB) to activate or stop traces or MDT |
| DL/UL NAS Message Transfer | AN service used by AN NFs (intra-gNB) to deliver DL/UL NAS PDUs to/from UEs |
| UE Positioning | AN service used by AN NFs (inter-gNB or intra-gNB) to obtain/configure UE measurement or to enable RAN-LMF to calculate the position. |
| UE Paging | AN service used by AN NFs (inter-gNB or intra-gNB) to page UEs (e.g., CN paging or RAN paging) |
| UE Activity Resume Notification | AN service used by AN NFs (inter-gNB or intra-gNB) to resume UE connection, where inter-gNB can be used for the dual connectivity |
| Warning Message Delivery | AN service used by AN NFs (intra-gNB) to request the broadcast of a warning message or to cancel an on-going warning message broadcast. |
| Broadcast/Multicast | AN service used by AN NFs (inter-gNB or intra-gNB) to request the broadcast or multicast of user plane packets |
| AN Data Analytics | AN service used to get statistics from the AN and to process the statistics within AN. Used by RAN-NEF or other RAN Nodes, other service-based domains, e.g., MDAF |
| Interference Management | AN service used by AN NFs (inter-gNB or intra-gNB) to enable controlling interference created by another AN-node/aggressor AN node |
| Data Storage | AN service used by AN NFs to store and retrieve structured (i.e. 3GPP defined) or unstructured (i.e. implementation specific) data. |
| Self-optimizing network service | AN service used by AN NFs to, e.g., provide optimal network configurations, discover new neighbor cells/relations, and attain mobility robustness |

The AN service registration and discovery service may be mapped to a repository functionality, e.g., an NRF, and such functionality can be implemented in a centralized way, e.g., RAN-NRF or a distributed way, e.g., AN node NRF. Furthermore, the UE mobility service and the UE trace service may be merged into the UE context service.

In addition, DRB resource may comprise the DRB termination (create/modify/release/Subscribe) aspect. For instance, as part of this aspect, the CU UP may be requested to allocate a F1 F-TEID; Subscribe may be used for CU-CP (UE management) to receive notifications that a modification of a bearer context is required (e.g., due to local problems at the CU-UP), and/or about the UE (in)activity, and/or about the DL data detection, and/or to report data volume (there may be other cases). RAN NRF may be used to register and discover capabilities of the CU UP (should replace SET UP and CONFIGURATION UPDATE). DRB termination may be offered as a separate service.

Mapping of Services onto NFs & SB Overall Architecture Based on NFs:

The aforementioned services (Tables 1 to 3) may be mapped on the network functions (NFs) within the AN. Table 4 provides an example mapping. Depending on implementation, the granularity of such mapping can be different, e.g., more or fewer NFs can be implemented, which offer such services.

TABLE 4

Mapping of services onto NFs

| AN NF | Description: | Services |
|---|---|---|
| AN-Network Repository Function (AN-NRF) | Access Network Repository Function, supporting AN service registration and discovery | AN Service Registration<br>AN Service Discovery<br>AN service change Subscription and Notification |
| UE Management Function (UMF) | Function supporting UE related services | UE Context<br>UE Mobility (or could be merged in UE context service)<br>PDU Session Resource<br>DRB Resource<br>DL NAS Message Transfer<br>UL NAS Message Transfer<br>AN Event Exposure<br>UE Positioning<br>UE Trace (or could be merged in UE context service)<br>UE Activity Resume Notification |
| Cell Management Function (CMF) | Function supporting cell related services | UE Paging<br>Warning Message Delivery<br>Broadcast/Multicast<br>Interference Management<br>Self-optimizing network service |
| AN Data Analytics Function (AN-DAF) | Access Network Data Analytics Function It supports AN data collection and analytics information provisioning to AN, CN, AF. | AN Data Analytics |
| AN-Network Exposure Function (AN-NEF) | Access Network Exposure Function Exposure of AN capabilities and events | AN Event Exposure |
| AN Data Storage Function (AN-DSF) | Access Data Storage Function | Data Storage |

A segregation of (R)AN and CN functions into separate NFs allows to classify the functions differently based on their periodicity and latency tolerance levels. This also allows supporting a different cardinality of the corresponding NRFs as required by a (R)AN node or a group of (R)AN nodes. I.e. the location and placement of NRF function corresponds to the service offered and could be directly dependent on the service characteristics.

The UE-associated services typically need real-time response and hence could be served closer to the radio, while the non-UE associated services could be served with a bigger cardinality.

Figure 3:
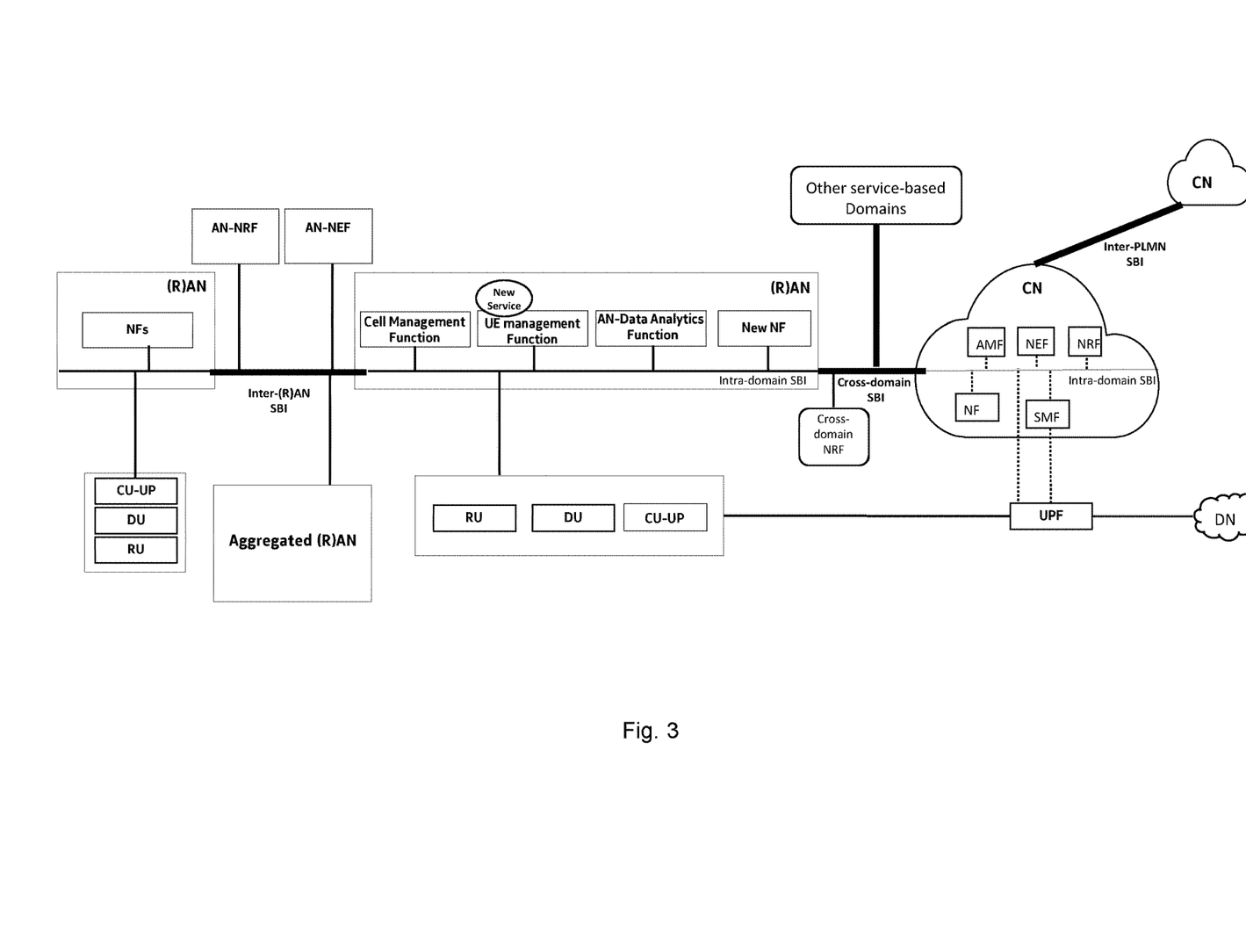
FIG. 3 shows SB overall architecture based on NFs according to some example embodiments of the invention.

On this basis, the SB overall architecture based on NFs is illustrated in FIG. 3.

The AN-NRF can be implemented in a centralized way, e.g., AN-NRF for multiple AN nodes, or a distributed way, e.g., per node AN-NRF, or per a subset of plural AN nodes. In particular the latter option may solve potential problems with respect to latency. For example, one may implement a "near-realtime" NRF ("near-realtime" e.g. as defined by ORAN) with fast, but expensive technology (HW, SW, firmware) to meet latency requirements at each or some of the nodes, while other NRFs (such as the CN NRF) may be based on scalable and more affordable technology. Also, the load may be distributed over several NRFs.

If plural NRFs are implemented, they may subscribe to notifications among each other (subscribe—notify). This may apply to NRFs within the (R)AN, between different (R)ANs, or between (R)AN and CN.

The AN-NEF can be implemented in a centralized way, e.g., AN-NEF for multiple AN nodes, or a distributed way, e.g., AN node NEF, or a NEF per a subset of plural NEFs. The AN-NEF may support exposure of AN events requiring the coordination of events reported from multiple AN nodes. The advantage of a distributed implementation in terms of latency is similar as discussed for NRF. The AN-NEF may support exposure of AN events requiring the coordination of events reported from multiple AN nodes. This may be coupled with/used for the network slicing, non-public network (NPN), and/or certain customers/verticals.

Some example embodiments of the invention provide interworking between ANs (other 3GPP ANs or even non-3GPP ANs including SNPN). Conventionally, such interworking is performed via CN. For example, such interworking may be useful for non-UE associated service (not involving the UE ID), such as interference management. AN-NEF may be utilized here which solves the challenge of setting up SCTP in a secure way. NEF can be used to provide FQDN and security credentials to set up TLS connection. SNPN and PLMN may be distinguished by their identifiers: Combination of PLMN ID (MCC+MNC) and NID identifies an SNPN. NID can either be universally managed or locally managed. PLMNs are identified by PLMN ID only.

In case of distributed RAN or virtual RAN the "CU-CP to AMF" bindings can be made dynamic as CP appears as a service (consumer/producer) to AMF or any CN NF. That is, it is not an a priori fixed connection but the connection/interface is built on the run time. On the other hand, if there is a prior association it can be changed as needed by policies and network events.

In more complex and distributed systems, a client may access many different NF providers (resource servers), which have different authorization servers managing access, e.g. AN specific, CP specific, CU specific etc. A priori knowledge by the client of the relationships between NF providers and authorizations servers is not practical as the number of NF providers and authorization servers scales up. Moreover, the access to a given resource/NF may be bound to a particular UE or groups of UEs. Combining the authentication and authorization with the NEF provides efficiencies as additional steps for NF provider/resource specific authorization can be avoided, and the access can be granted for specific transactions or execution of certain methods across an API.

The AN-DSF can be implemented in a centralized way, e.g., AN-DSF for multiple AN nodes, or a distributed way, e.g., AN node DSF. The AN-DSF may also expose information to NFs from other domains, e.g. CN, e.g. UE context information/state.

A new service can be introduced as part of an existing NF or a new NF. The AN-NRF can register its services at the cross-domain NRF. This can enable cross-domain service discovery.

Some gNBs may be decomposed into plural NFs, while other gNBs may not be decomposed (hybrid implementations). The identification of a NF may indicate whether it corresponds to a single gNB or to a function within the gNB. The granularity of the gNB implementation can be visible through the NF discovery process: Aggregated gNB can be represented by a single NF and decomposed gNB by multiple NFs. NF exposure to core network can be set by policies; for instance, in case of AN sharing the granularity can be different for different core networks. An NF can be reached via an address which can be in the format of an FQDN, IP address, or an ID.

Figure 4:
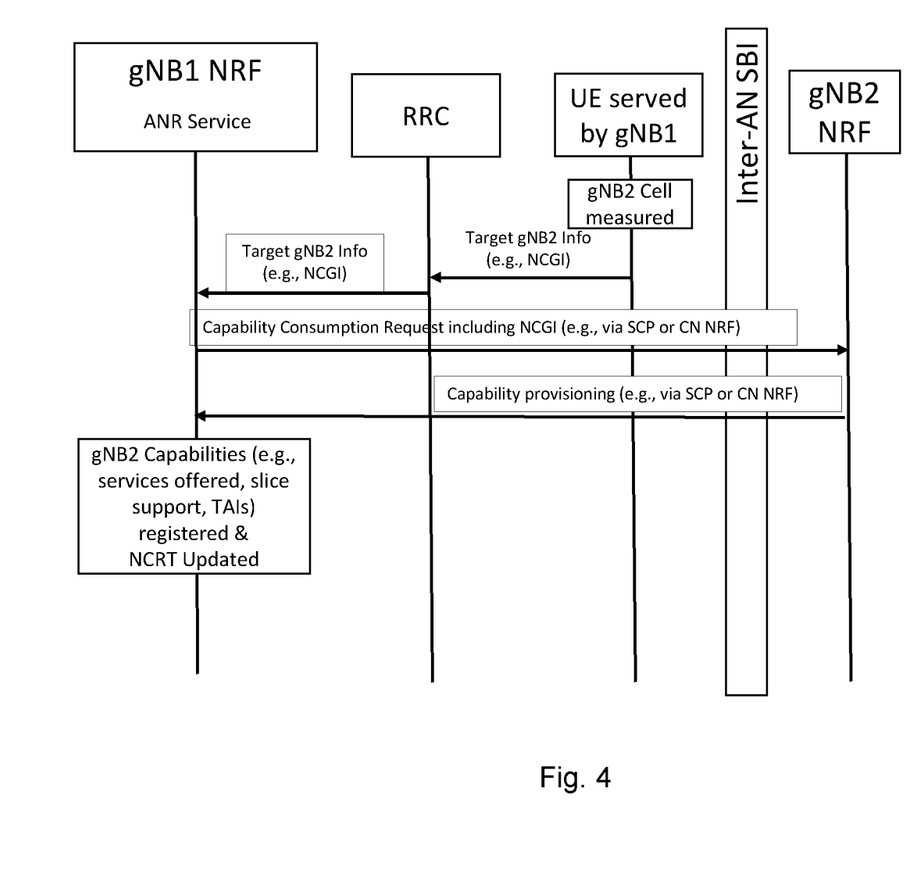
FIG. 4 shows a message flow according to some example embodiments of the invention.

SBA based (R)AN may solve at least one of the above-mentioned problems by:
  Attaining cloud-native NG-C based on Web technologies (HTTP based APIs are cloud-friendly, easy to deploy and open; largest user community for Web services).
  Enhanced scalability as operators can deploy 5G AN services (e.g., NG-C) independently from each other (e.g. scale "Paging" service instances dynamically as a function of traffic)
  Possibilities to instantiate different AN service instances per network slice
  Leveraging the SBA service framework, e.g. AN discovering the AMF using the NRF NF Discovery service, possible use of DSF to store AN data, Authorization procedures, Load/Overload control of SBIs, possibility to bypass AMFs for SON procedures, etc.
  Supporting embedded security (HTTPS), i.e., it does not require SeGW (Security Gatweway) to secure the AN-CN interface
  Enabling any type of 5G-AN (incl. 5G-AN supporting non-3GPP access) to use the above technologies FIG. 4 shows a message flow according to some example embodiments of the invention. The message flow is related to automatic neighbor relation detection in an SB-(R)AN architecture.

A UE being served by gNB1 measures a cell of gNB2. The UE informs gNB1 (e.g., via the RRC protocol of gNB1) on the measured cell using an identifier such as NCGI. Execution of the RRC protocol may be controlled by a CU-CP entity or another function in the gNB1. In some other embodiments, the RRC functionality may be provided as a service. The information from the UE is forwarded to NRF of gNB1. In this implementation example, ANR service is running on this NRF. In some other implementation examples, ANR service can correspond to a self-organizing network service. In some other embodiments, the self-organizing network service can correspond to a service registration and discovery service of the NRF. From NCGI, NRF of gNB1 may derive the NRF of gNB2 because NCGI comprises an ID of gNB2 (such as a FQDN, IP address, or any other type of ID), and the gNB ID is a part of the NF profile of the NRF. Thus, NRF of gNB1 queries the NRF of gNB2 for the capabilities of the detected cell identified by NCGI. In some embodiments, this inquiry can be handled via an SCP, another NRF, e.g., via CN NRF, or another NF, e.g., an NF in CN. In some embodiments, the identifier may be also used by an SCP or CN-NRF to identify the target gNB2 NRF, in case the target gNB2 NRF is not known by the gNB1 NRF. In return, NRF of gNB2 provides an indication of the capabilities of the cell. NRF of gNB1 or NRF of gNB2 may update their NCRTs. In addition, the capabilities may be used for various decisions related to the newly detected cell, such as a handover decision to the cell for a UE, interference management with respect to the cell, load balancing with the cell, traffic steering with respect to the cell, addition of the cell as a secondary cell, mobility robustness optimization with respect to the cell, optimization of radio resource management with respect to the cell, and further measures of a self-optimizing network related to the cell.

Figure 5:
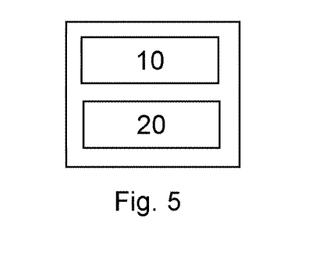
FIG. 5 shows an apparatus according to an example embodiment of the invention.
Figure 6:
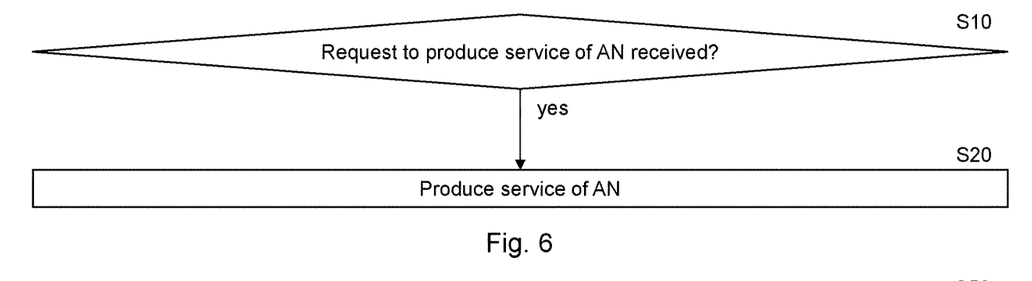
FIG. 6 shows a method according to an example embodiment of the invention.

FIG. 5 shows an apparatus according to an example embodiment of the invention. The apparatus may be a service producer of an access network such as a base station (e.g. gNB, eNB), or a network function thereof, or an element thereof. FIG. 6 shows a method according to an example embodiment of the invention. The apparatus according to FIG. 5 may perform the method of FIG. 6 but is not limited to this method. The method of FIG. 6 may be performed by the apparatus of FIG. 5 but is not limited to being performed by this apparatus.

The apparatus comprises means for monitoring 10 and means for producing 20. The means for monitoring 10 and means for producing 20 may be a monitoring means and producing means, respectively. The means for monitoring 10 and means for producing 20 may be a monitor and a producer, respectively. The means for monitoring 10 and means for producing 20 may be a monitoring processor and producing processor, respectively.

The means for monitoring 10 monitors whether a request to produce a producer service ("a service request") is received (S10). The producer service is a service of an access network.

If the request is received (S10=yes), the means for producing 20 produces the producer service (S20).

Figure 7:
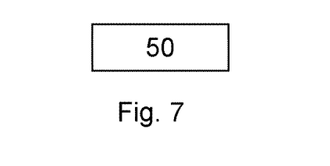
FIG. 7 shows an apparatus according to an example embodiment of the invention.
Figure 8:
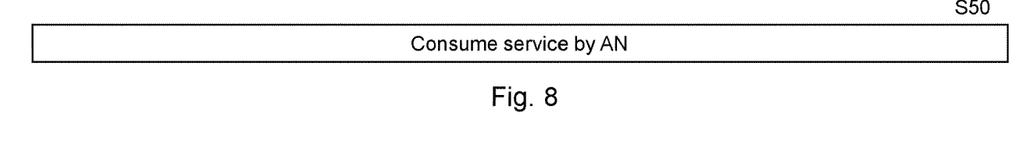
FIG. 8 shows a method according to an example embodiment of the invention.

FIG. 7 shows an apparatus according to an example embodiment of the invention. The apparatus may be a service producer of an access network such as a base station (e.g. gNB, eNB), or a network function thereof, or an element thereof. FIG. 8 shows a method according to an example embodiment of the invention. The apparatus according to FIG. 7 may perform the method of FIG. 8 but is not limited to this method. The method of FIG. 8 may be performed by the apparatus of FIG. 7 but is not limited to being performed by this apparatus.

The apparatus comprises means for consuming 50. The means for consuming 50 may be a consuming means. The means for consuming 50 may be a consumer. The means for consuming 50 may be a consuming processor.

The means for consuming 50 consumes a producer service from a core network or an access network (S50). The producer service is consumed by an access network.

The apparatus of FIG. 7 may be the same apparatus as that of FIG. 5 or different therefrom. The producer service produced by the apparatus of FIG. 5 may be the same as the producer service of the access network consumed by the means for consuming 50 are different therefrom.

Figure 9:
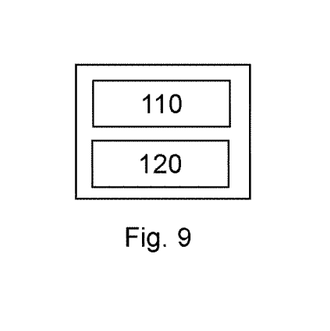
FIG. 9 shows an apparatus according to an example embodiment of the invention.
Figure 10:
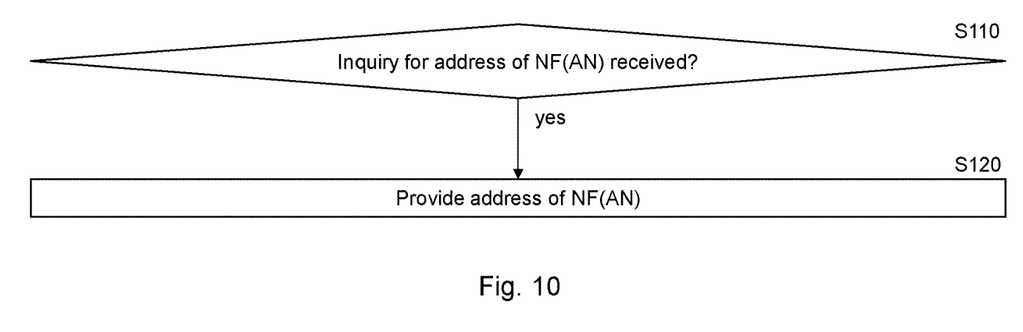
FIG. 10 shows a method according to an example embodiment of the invention.

FIG. 9 shows an apparatus according to an example embodiment of the invention. The apparatus may be a repository function of an access network such as a NRF, or an element thereof. FIG. 10 shows a method according to an example embodiment of the invention. The apparatus according to FIG. 9 may perform the method of FIG. 10 but is not limited to this method. The method of FIG. 10 may be performed by the apparatus of FIG. 9 but is not limited to being performed by this apparatus.

The apparatus comprises means for monitoring 110 and means for providing 120. The means for monitoring 110 and means for providing 120 may be a monitoring means and providing means, respectively. The means for monitoring 110 and means for providing 120 may be a monitor and a provider, respectively. The means for monitoring 110 and means for providing 120 may be a monitoring processor and providing processor, respectively.

The means for monitoring 110 monitors whether an inquiry for an address of a network function producing a service of an access network is received (S110). The service comprises at least one of a service registration and discovery service of the access network; a protocol data unit session resource service of the access network; a context service of a terminal served by the access network; a mobility service of a terminal served by the access network; a tracing service of a terminal served by the access network; a downlink and/or uplink non-access stratum message transfer service of the access network; an event exposure service of the access network; a positioning service of a terminal served by the access network; a paging service of a terminal served by the access network; a warning message delivery service of the access network; a broadcast and/or multicast service of the access network; a data analytics service of the access network; a data storage service of the access network; a data radio bearer service of the access network; and a self-optimizing network service of the access network.

If the inquiry is received (S110=yes), the means for providing 120 provides the address of the network function in response to the inquiry (S120).

Figure 11:
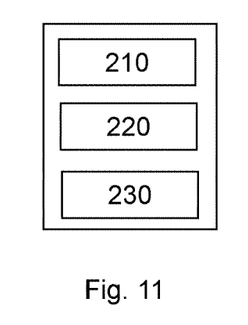
FIG. 11 shows an apparatus according to an example embodiment of the invention.
Figure 12:
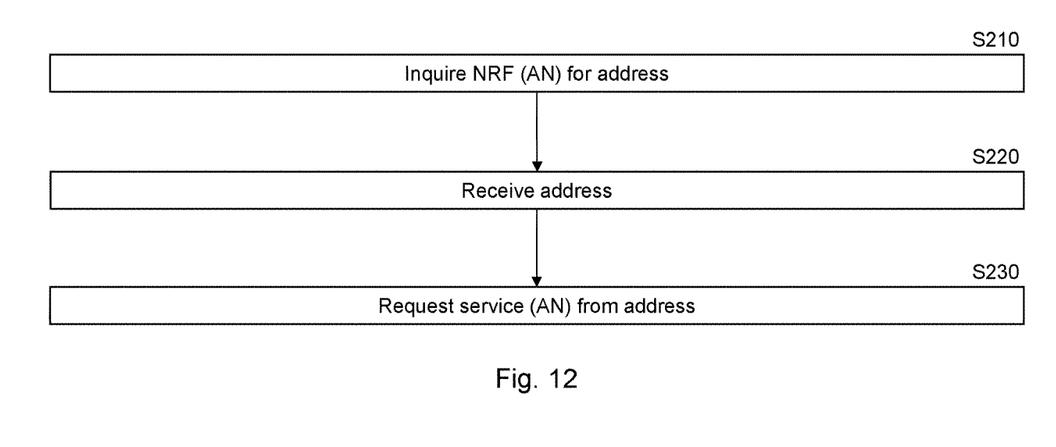
FIG. 12 shows a method according to an example embodiment of the invention.

FIG. 11 shows an apparatus according to an example embodiment of the invention. The apparatus may be a service consumer consuming a producer service of an access network or an element thereof. FIG. 12 shows a method according to an example embodiment of the invention. The apparatus according to FIG. 11 may perform the method of FIG. 12 but is not limited to this method. The method of FIG. 12 may be performed by the apparatus of FIG. 11 but is not limited to being performed by this apparatus.

The apparatus comprises means for inquiring 210, means for receiving 220, and means for requesting 230. The means for inquiring 210, means for receiving 220, and means for requesting 230 may be an inquiring means, receiving means, and requesting means, respectively. The means for inquiring 210, means for receiving 220, and means for requesting 230 may be an inquirer, a receiver, and a requester, respectively. The means for inquiring 210, means for receiving 220, and means for requesting 230 may be an inquiring processor, receiving processor, and requesting processor, respectively.

The means for inquiring 210 inquires a repository function of an access network for an address of a service producer of a producer service of the access network (S210).

In response to the inquiring of S210, the means for receiving 220 receives the address of the service producer or an address of the access network's producer service (S220).

Using the address received in S220, the means for requesting 230 requests the producer service of the access network from the service producer (S230).

Figure 13:
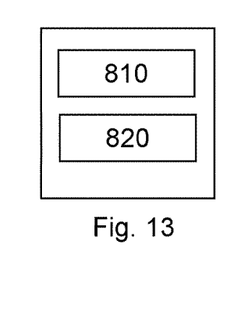
FIG. 13 shows an apparatus according to an example embodiment of the invention.

FIG. 13 shows an apparatus according to an embodiment of the invention. The apparatus comprises at least one processor 810, at least one memory 820 including computer program code, and the at least one processor 810, with the at least one memory 820 and the computer program code, being arranged to cause the apparatus to at least perform at least one of the methods according to FIGS. 6, 8, 10, and 12 and related description.

Some example embodiments are explained with respect to a 6G network. However, the invention is not limited to 6G. It may be used in other networks, too, e.g. in previous or forthcoming generations of 3GPP networks such as 3G, 4G, 5G, 7G, etc. The invention is not limited to 3GPP networks but may be used for other access networks, too.

One piece of information may be transmitted in one or plural messages from one entity to another entity. Each of these messages may comprise further (different) pieces of information.

Names of network elements, network functions, protocols, and methods are based on current standards. In other versions or other technologies, the names of these network elements and/or network functions and/or protocols and/or methods may be different, as long as they provide a corresponding functionality.

If not otherwise stated or otherwise made clear from the context, the statement that two entities are different means that they perform different functions. It does not necessarily mean that they are based on different hardware. That is, each of the entities described in the present description may be based on a different hardware, or some or all of the entities may be based on the same hardware. It does not necessarily mean that they are based on different software. That is, each of the entities described in the present description may be based on different software, or some or all of the entities may be based on the same software. Each of the entities described in the present description may be deployed in the cloud.

According to the above description, it should thus be apparent that example embodiments of the present invention provide, for example, a network function of an access network, such as a base station (e.g. eNB, gNB), or a component thereof, an apparatus embodying the same, a method for controlling and/or operating the same, and computer program(s) controlling and/or operating the same as well as mediums carrying such computer program(s) and forming computer program product(s).

Implementations of any of the above described blocks, apparatuses, systems, techniques or methods include, as non-limiting examples, implementations as hardware, software, firmware, special purpose circuits or logic, general purpose hardware or controller or other computing devices, or some combination thereof. Each of the entities described in the present description may be embodied in the cloud.

It is to be understood that what is described above is what is presently considered the preferred embodiments of the present invention. However, it should be noted that the description of the preferred embodiments is given by way of example only and that various modifications may be made without departing from the scope of the invention as defined by the appended claims.

The invention claimed is:

1. Apparatus comprising:
one or more processors, and
memory storing instructions of a first network function of an access network that, when executed by the one or more processors, cause the apparatus to perform at least one of the following:
a) monitoring whether a service request to produce a producer service is received; and
  in response to receipt of the service request, producing the producer service, wherein the producer services comprises: a producer service registration and discovery service of the access network; a producer protocol data unit session resource service of the access network; a producer context service of a terminal served by the access network; a producer mobility service of a terminal served by the access network; a producer tracing service of a terminal served by the access network; a producer downlink and uplink non-access stratum message transfer service of the access network; a producer event exposure service of the access network; a producer positioning service of a terminal served by the access network; a producer paging service of a terminal served by the access network; a producer warning message delivery service of the access network; a producer broadcast and/or multicast service of the access network; a producer data analytics service of the access network; a producer data storage service of the access network; a producer data radio bearer service of the access network; and a producer self-optimizing network service of the access network; and
b) consuming a producer service produced by a second network function of the access network by:
  sending, to a repository function of the access network, a request to provide an address of the second network function of the access network producing the producer service, wherein the producer service produced by the second network function of the access network is the self-optimizing network service of the access network;
  receiving the address of the second network function of the access network producing the producer service;
  sending, to the address of the second network function of the access network, a request to consume the producer service produced by the second network function of the access network, wherein the producer service produced by the second network function comprises the following: a service registration and discovery service of the access network; a context service of a terminal served by the access network; a mobility service of a terminal served by the access network; a tracing service of a terminal served by the access network; a downlink and uplink non-access stratum message transfer service of the access network; an event exposure service of the access network; a positioning service of a terminal served by the access network; a paging service of a terminal served by the access network; an activity resume notification service of a terminal served by the access network; a warning message delivery service of the access network; a broadcast and multicast service of the access network; a data analytics service of the access network; a data storage service of the access network; a data radio bearer service of the access network; an interference management service of the access network; and a self-optimizing network service of the access network, wherein the capability comprises: a service offered by the cell; a support of a network slice by the cell; and a tracking area to which the cell belongs;
  receiving an identifier of a cell detected by a first terminal served by the access network;
  sending, to the repository function of the access network, a request to provide information on a capability offered by the cell having the identifier;
  receiving the information on the capability;
  storing the information on the capability in association with the identifier;
  taking account of the capability in a decision related to the cell, and wherein the capability is taken into account in the following: a handover decision to the cell for a second terminal, interference management with respect to the cell, load balancing with the cell, traffic steering with respect to the cell, addition of the cell as a secondary cell, mobility robustness optimization with respect to the cell, optimization of radio resource management with respect to the cell, or further measures of a self-optimizing network related to the cell.

2. The apparatus according to claim 1, wherein the first network function of the access network comprises at least one of the following: a network repository function of the access network, a user management function of the access network, a cell management function of the access network, a data analytics function of the access network, a network exposure function of the access network, and a data storage function of the access network.

3. The apparatus according to claim 1, wherein the instructions, when executed by the one or more processors, further cause the apparatus to:
register an address of the first network function of the access network producing the producer service with a network repository function of the access network.

* * * * *